United States Patent
Rao et al.

(10) Patent No.: US 6,628,227 B1
(45) Date of Patent: Sep. 30, 2003

(54) METHOD AND APPARATUS FOR DETERMINING A TARGET VEHICLE POSITION FROM A SOURCE VEHICLE USING A RADAR

(75) Inventors: Manoharprasad K. Rao, Novi, MI (US); Nikolay V. Smirnov, Leningradskaya obl. (RU); Kwaku O. Prakah-Asante, Commerce Twp., MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/201,670

(22) Filed: Jul. 23, 2002

(51) Int. Cl.⁷ .................... G01S 13/00; G06F 17/10; G06G 7/78
(52) U.S. Cl. ............................... 342/70; 701/301
(58) Field of Search ................ 342/70; 180/167, 180/169; 340/435, 436, 438; 701/301, 223, 96

(56) References Cited

U.S. PATENT DOCUMENTS

| | | | |
|---|---|---|---|
| 5,936,549 A | | 8/1999 | Tsuchiya |
| 5,964,822 A | | 10/1999 | Alland et al. |
| 6,085,151 A | * | 7/2000 | Farmer et al. ............. 701/301 |
| 6,087,928 A | | 7/2000 | Kleinberg et al. |
| 6,163,252 A | * | 12/2000 | Nishiwaki .................. 340/435 |
| 6,396,397 B1 | * | 5/2002 | Bos et al. .................... 340/461 |
| 6,396,435 B1 | * | 5/2002 | Fleischhauer et al. ........ 342/70 |
| 6,476,760 B1 | * | 11/2002 | Winter et al. ............... 342/173 |
| 6,522,288 B1 | * | 2/2003 | Paradie et al. ............. 342/145 |
| 6,542,111 B1 | * | 4/2003 | Wilson ........................ 342/70 |

* cited by examiner

Primary Examiner—Thomas H. Tarcza
Assistant Examiner—Brian Andrea
(74) Attorney, Agent, or Firm—Artz & Artz; Frank A. MacKenzie

(57) ABSTRACT

A sensing system (10) for an automotive vehicle includes a first radar sensor (18) generating a first and a second range signal, and a second radar sensor (20) generating a first and a second range signal corresponding to two sampling time periods. A controller (12) is coupled to the first radar sensor (18) and the second radar sensor (20). The controller (12) calculates a first position and a second position from the first radar sensor and the second radar sensor range measurements. The controller (12) generates a first set of points corresponding to the first position and a second set of points corresponding to the second position. The controller (12) calculates a plurality of calculated range-rate values in response to the first set of points and the second set of points. The controller (12) compares the plurality of calculated range-rate values to the measured range-rate and selects the closest range-rate from the plurality of calculated range-rate values. A couple of target position points is generated from the first set of points and the second set of points corresponding to the calculated closest range-rate.

17 Claims, 5 Drawing Sheets

METHOD AND APPARATUS FOR DETERMINING A TARGET VEHICLE POSITION FROM A SOURCE VEHICLE USING A RADAR

TECHNICAL FIELD

The present invention relates to a radar system for automotive vehicles, and more particularly, to a position detection system in a source vehicle for determining the relative position of a target.

BACKGROUND

Auto manufacturers are investigating radar, lidar, and vision-based pre-crash sensing systems to improve occupant safety. Current vehicles typically employ accelerometers that measure vehicle body decelerations in the event of a crash. In response to accelerometers, airbags or other safety devices are deployed.

In certain crash situations it would be desirable to provide information before forces actually act upon the vehicle when a collision is unavoidable. Such information may include the position of a target vehicle relative to a source vehicle.

Remote sensing systems using radar are used in adaptive cruise control, collision avoidance and collision warning applications. These systems have characteristic requirements for false detection. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation.

To meet wide-angle coverage requirements for pre-crash sensing purposes, multiple pulsed radar based sensing systems are being investigated for automotive applications. Multiple, pulsed radar sensor based systems with a wide field of coverage are available. Triangulation techniques with individual radar range measurements are used with multiple pulsed radar systems for object position estimation.

Triangulation techniques used for object position identification may result in the occurrence of false intersections or ghosts and inaccuracies in object bearing estimations due to individual radar sensor range measurement errors. Ghost elimination is an important aspect of object track initiations and track data associations, and various proprietary techniques are employed by radar tracking system developers for this task.

The accuracy with which range can be measured by a radar is limited by the signal bandwidth and signal to noise ratio. Many other error sources particular to individual radars also act to limit range measurement accuracy where inaccuracies cause large variations in object azimuth position estimation with triangulation techniques. Accurate azimuth position estimation is needed for reliable object tracking and threat assessment for automotive safety applications.

It would therefore be desirable to provide a reliable method for determining the position of a target vehicle.

SUMMARY OF THE INVENTION

The present invention provides an improved pre-crash sensing system that improves azimuth measurements and therefore provides more accurate angular position information for a target vehicle.

In one aspect of the invention, a sensing system for an automotive vehicle includes a first radar sensor and a second radar sensor generating a first range signal and a second range signal related to the target object, at two separate times. A controller is coupled to the first radar sensor and the second radar sensor. The controller calculates a first position and a second position from the first radar sensor and the second radar sensor range measurements. The controller generates a first set of points corresponding to the first position and a second set of points corresponding to the second position. The controller calculates a plurality of range-rate values in response to the first set of points and the second set of points. The controller compares the plurality of calculated range-rate values to the measured range-rate and selects the closest range-rate from the plurality of range-rate values. A couple of target position points are generated, one from the first set of points and the other from the second set of points that correspond to the closest measured range-rate.

In a further aspect of the invention, a method of determining the position of a target vehicle comprises: determining a first range and a second range from a first radar and a second radar sensor; calculating a first position and a second position from the first range and second range measurements; evaluating a measured range-rate; generating a first set of points corresponding to the first position; generating a second set of points corresponding to the second position; calculating a plurality of calculated range-rate values in response to the first set of points and the second set of points; comparing the plurality of calculated range-rate values to the measured range-rate; selecting the closest calculated range-rate from the plurality of calculated range-rate values to the measured range-rate; selecting a couple of target position points from the first set of points and the second set of points corresponding to the closest calculated range-rate to the measured range-rate.

One advantage of the invention is that by more accurately determining the relative position of the target vehicle, activation of the proper countermeasure at the proper time is more accurately performed.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
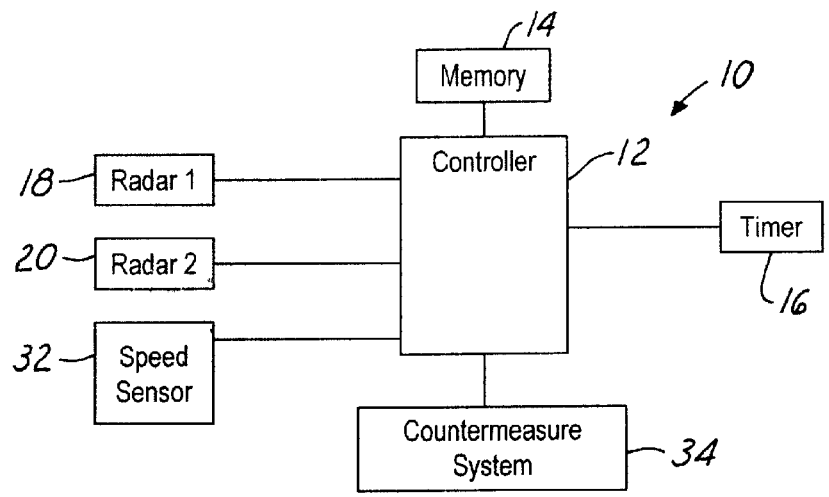
FIG. 1 is a block diagrammatic view of a pre-crash sensing system according to the present invention.

In the following figures the same reference numerals will be used to identify the same components. In the following description, the source vehicle is the vehicle performing the processing to perform a countermeasure. The target vehicle is the vehicle being monitored by the source vehicle for a potential collision.

Referring now to FIG. 1, a pre-crash system 10 for use in a source vehicle has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For example, by measuring a change in speed over a time counted by timer 16, acceleration may be determined. Of course, acceleration may be measured using a separate accelerometer.

A pair of radar sensors 18 and 20 is coupled to controller 12. Radar sensors 18 and 20 generate an object signal in the presence of an object within its field of view. The radar sensors 18, 20 preferably generate both range data and range-rate. However, only one radar sensor needs to generate range-rate. By spacing the radars 18, 20 on the vehicle the range data may be used to obtain a position of a target vehicle relative to a source vehicle as will be described below. One type of radar for the present application is a Doppler radar. More specifically, pulsed Doppler radar sensors were used in one constructed embodiment.

A speed sensor 32 is also coupled to controller 12. Speed sensor 32 may be one of a variety of speed sensors known to those skilled in the art. For example, a suitable speed sensor may include a sensor at every wheel that is averaged by controller 12. Preferably, controller 12 translates the wheel speeds into the speed of the vehicle. Suitable type of speed sensors 32 may include, for example, toothed wheel sensors such as those employed on anti-lock brake systems.

Controller 12 is used to control the activation of a countermeasure system 34. Countermeasure system 34 may include one or several types of countermeasures each having an individual actuator associated therewith. In that case, controller 12 may direct the individual countermeasure actuator to activate the countermeasure. Various types of countermeasure systems will be evident to those skilled in the art. Examples of a countermeasure within countermeasure system 34 include occupant belt pretensioning, bumper height changing, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors. As will be described below, the controller may choose the countermeasure or countermeasures based on the position and other pertinent data of the source vehicle and an approaching target vehicle.

Figure 2:
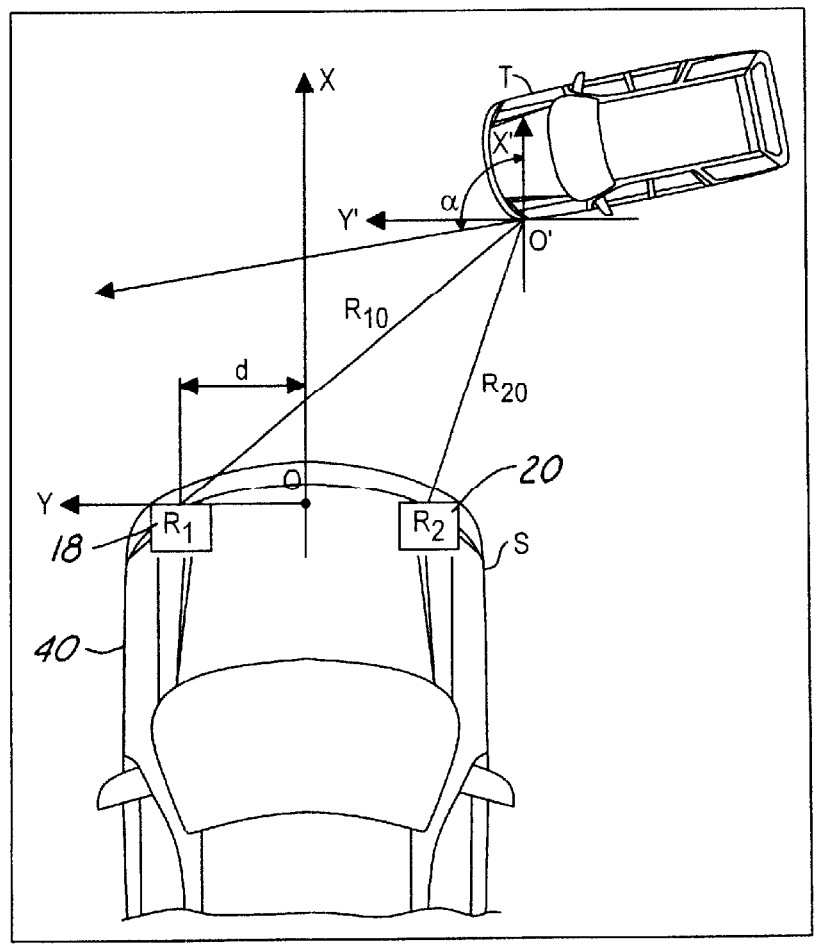
FIG. 2 is a top view of an automotive vehicle illustrating the coordinate system used herein.

Referring now to FIG. 2, a source vehicle S is illustrated relative to a target vehicle T. This, for example, may be at an intersection of two roads. The angle of the intersection may have any value within the interval $(0, \pi)$. Source vehicle S and target vehicle T are moving towards an intersection from different directions. It will be assumed that both vehicles are moving in a straight line with constant accelerations. Denote $a_s$ and $a_t$ as absolute values of accelerations for source vehicle S and target vehicle T, respectively. Assumed also is that source vehicle S has two radar sensors symmetrically located at the front of the source vehicle S at the distance d from the centerline. Each radar 18,20 measures the distance R from the target vehicle with accuracy $\pm \Delta R$ and the relative velocity (range-rate). The value $\Delta t$ is the interval of time between two measurements. Source vehicle S velocity, $v_s(0)=v_{s0}$, and acceleration $a_s$ are measurable using the speed sensor 32 and timer 16 described above.

In a Cartesian coordinate system $O_{XY}$, the origin, is located at point O which corresponds to the center of the front of source vehicle S. Axis $O_X$ corresponds to the longitudinal axis of source vehicle S. The coordinate system is fixed at time t=0. The coordinates $(x_0, y_0)$ are the coordinates of the target vehicle T in $O_{XY}$ at the moment t=0. An auxiliary coordinate system $O'_{X'Y'}$ is used having an origin O' corresponding to $(x_0, y_0)$ of coordinate system $O_{XY}$. Axes $O'_{X'}$ and $O'_{Y'}$ are parallel to $O_X$ and $O_Y$, respectively.

Two measurements are taken at time $t_0$ and $t_1$ by the two radar sensors.

First radar:

$$t_0=0: R_{10}, \dot{R}_{10}$$

$$t_1=\Delta t: R_{11}, \dot{R}_{11}. \quad (2.1)$$

Second radar:

$$t_0=0: R_{20}, \dot{R}_{20}$$

$$t_1=\Delta t: R_{21}, \dot{R}_{21}. \quad (2.2)$$

The first subscript in (2.1) and (2.2), is the radar number (radar 1 is 18, radar 2 is 20), and the second corresponds to the moment in time.

In this first example it is presumed that the measurements are absolutely accurate, i.e. $\Delta R=0$. Later, the case for $\Delta R \neq 0$ is described using the teachings of this first example. Using measurements (2.1), (2.2), the following variables (parameters of the target vehicle T) may be determined:

Initial position coordinates of the target—$(x_0, y_0)$;

Initial velocity absolute value of the target—$v_t(0)=v_{t0}$;

Acceleration absolute value of the target—$a_t$;

Angle corresponding to direction of motion of the target—$\alpha$

At t=0, initial position coordinates $(x_0, y_0)$ of target vehicle T may be found as two circular intersection point coordinates. These circles have radii $R_{10}, R_{20}$, and centers at the points $(0, d)$, and $(0, -d)$, corresponding to the coordinates of the radar locations in coordinate system $O_{XY}$.

The equations governing the circumference give a system $$\left. \begin{array}{l} x^2 + (y-d)^2 = R_{10}^2 \\ x^2 + (y+d)^2 = R_{20}^2 \end{array} \right\} \quad (3.1)$$

From the first equation of (3.1) we have $$x^2 = R_{10}^2 - (y-d)^2.$$

From the second $$R_{10}^2 - (y-d)^2 + (y+d)^2 R_{20}^2.$$

Finally, after further simplification, $$y_0 = \frac{R_{20}^2 - R_{10}^2}{4d}, \quad (3.2)$$

$$x_0 = \pm \sqrt{R_{10}^2 - (y_0 - d)^2}. \quad (3.3)$$

It is assumed that $x_0 > 0$, in (3.3) it can only be a positive value.

Figure 3:
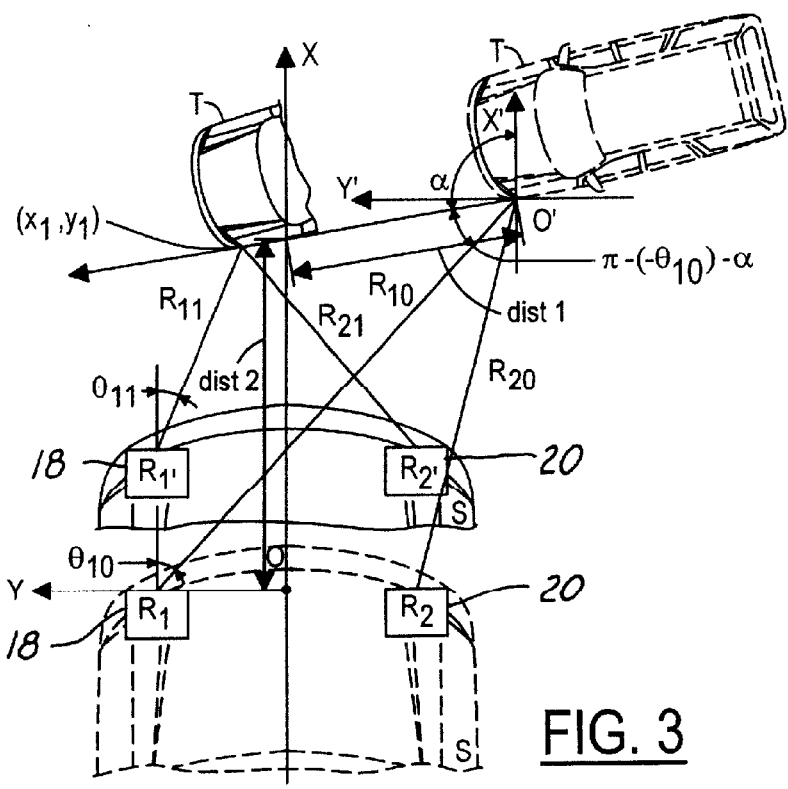
FIG. 3 is a top view of an automotive vehicle illustrating the coordinate system having a target vehicle and a source vehicle at two different times.

Referring now to FIG. 3, the second position of the target vehicle T is determined. In this figure, $(x_1, y_1)$ represent the second position coordinates of target vehicle T in $O_{XY}$ at the moment $t_1 = \Delta t$. The points $(x_{1s}, y_{1s})$, $(x_{2s}, y_{2s})$ are the second position coordinates of radars in $O_{XY}$.

Thus, $$\left. \begin{array}{l} x_{1s} = v_{s0}\Delta t + \frac{1}{2} a_s \Delta t^2 \\ y_{1s} = d \end{array} \right\} \quad (3.4)$$

and, $$\left. \begin{array}{l} x_{2s} = v_{s0}\Delta t + \frac{1}{2} a_s \Delta t^2 \\ y_{2s} = -d \end{array} \right\} \quad (3.5)$$

Point $(x_1, y_1)$ is an intersection of two circles with center points (3.4), (3.5). Consider the equations of these circles as a system for determining $(x_1, y_1)$, $$\left. \begin{array}{l} \left(x - v_{s0}\Delta t - \frac{1}{2} a_s \Delta t^2\right)^2 + (y-d)^2 = R_{11}^2 \\ \left(x - v_{s0}\Delta t - \frac{1}{2} a_s \Delta t^2\right)^2 + (y+d)^2 = R_{21}^2 \end{array} \right\} \quad (3.6)$$

The solution of system (3.6) is $$y_1 = \frac{R_{21}^2 - R_{11}^2}{4d}, \quad (3.7)$$

$$x_1 = \pm \sqrt{R_{11}^2 - (y_1 - d)^2} + v_{s0}\Delta t + \frac{1}{2} a_s \Delta t^2. \quad (3.8)$$

It is assumed that $x_1 > 0$, in (3.8) it can only be a positive value.

Using the two positions coordinates of the target vehicle determined from (3.2), (3.3), (3.7), and (3.8), angle a may be found uniquely.

Consider expressions $$x_1 - x_0 = \rho \cos \alpha,$$

$$y_1 - y_0 = \rho \sin \alpha,$$

where $$\rho = \sqrt{(x_1 - x_0)^2 + (y_1 - y_0)^2}$$

is the distance between points $(x_0, y_0)$ and $(x_1, y_1)$. As a result we have $$\cos \alpha = \frac{x_1 - x_0}{\rho}, \quad (3.9)$$

$$\sin \alpha = \frac{y_1 - y_0}{\rho}. \quad (3.10)$$

Values $\cos \alpha$ and $\sin \alpha$ determine the moving direction of target T. Therefore, it is not necessary to find the actual angle $\alpha$.

Angles $\theta_{10}$, $\theta_{11}$ are also determined. $\theta$ is the angle between axis $O_X$ and the direction from a radar to the target (the first subscript for $\theta_{10}$, and $\theta_{11}$, is the number of the radar, and the second one corresponds to the instant in time.)

$$Case \ y_0 < 0, \quad \alpha \in (\frac{\pi}{2}, \pi).$$

Thus, $$\cos \theta_{10} = \frac{x_0}{R_{10}}, \quad (3.11)$$

and $$\sin \theta_{10} = \frac{y_0 - d}{R_{10}}, \quad (3.12)$$

where point $(x_0, y_0)$ is obtained from (3.2), (3.3). Analogously, at $t = \Delta t$ $$\cos \theta_{11} = \frac{x_1 - x_{1s}}{R_{11}}, \quad (3.13)$$

$$\sin \theta_{11} = \frac{y_1 - y_{1s}}{R_{11}} = \frac{y_1 - d}{R_{11}}. \quad (3.14)$$

Here point $(x_1, y_1)$ is derived from (3.7), (3.8) and $(x_{1s}, y_{1s})$ is derived from (3.4).

To calculate the initial velocity of the target $v_{t0}$ the range-rate $\dot{R}_{10}$ measured from the radar sensor 18 is used. Consider the well-known equation $$R\dot{R} = x\dot{x} + y\dot{y}.$$

At $t = 0$, $$R_{10}\dot{R}_{10} = x_0 \dot{x}_0 + (y_0 - d)\dot{y}_0$$

or $$\dot{R}_{10} = \frac{x_0}{R_{10}}\dot{x}_0 + \frac{y_0-d}{R_{10}}\dot{y}_0 = (\vec{e}_{R_{10}} \cdot \vec{v}_0), \quad (3.15)$$

where $$\vec{e}_{R_{10}} = \left(\frac{x_0}{R_{10}}, \frac{y_0}{R_{10}}\right)^T$$

is the identity vector for $\vec{R}_{10}$, and $\vec{v}_0 = (\dot{x}_0, \dot{y}_0)^T$ is the velocity vector of the target at the moment t=0. It follows from (3.15) that the value $\dot{R}_{10}$ is a velocity vector projection with sign onto the direction defined with vector $\vec{R}_{10}$. This projection is calculated using information about angles $\alpha$ and $\theta_{10}$. Consider equation (3.15) in the following form $$\dot{R}_{10} = -v_{s0}\cos\theta_{10} - v_{t0}\cos(\pi+\theta_{10}-\alpha).$$

The minus signs on the right side of this expression indicate the fact that the distance between vehicles decreases when moving towards the intersection. Using the well known trigonometric identity $$\cos(\pi+\theta_{10}-\alpha) = -\cos(\theta_{10}-\alpha)$$

The previous equation becomes $$\dot{R}_{10} = -v_{s0}\cos\theta_{10} + v_{t0}\cos(\theta_{10}-\alpha). \quad (3.16)$$

From (3.16)

$$v_{t0} = \frac{\dot{R}_{10} + v_{s0}\cos\theta_{10}}{\cos(\theta_{10}-\alpha)}.$$

Using the identity $$\cos(\theta_{10}-\alpha) = \cos\theta_{10}\cos\alpha + \sin\theta_{10}\sin\alpha$$

and therefore, $$v_{t0} = \frac{\dot{R}_{10} + v_{s0}\cos\theta_{10}}{\cos\theta_{10}\cos\alpha + \sin\theta_{10}\sin\alpha}. \quad (3.17)$$

Formula (3.17) uniquely determines the absolute value of initial velocity of the target $v_{t0}$ using (3.9)–(3.12).

To calculate the absolute value $a_t$ of acceleration of the target, the well-known relation $$x_1 = x_0 + v_{t0}\cos\alpha\Delta t + \frac{1}{2}a_t\cos\alpha\Delta t^2$$

is used.
Finally, $$a_t = 2\frac{x_1 - x_0 - v_{t0}\cos\alpha\Delta t}{\cos\alpha\Delta t^2}, \quad (3.18)$$

where $x_1$ is determined in (3.8).

Equation (3.18) uniquely determines the absolute value of acceleration of the target $a_t$ using (3.3), (3.8), (3.9), (3.17). Moreover, the result may be checked using a calculation using the y co-ordinates.

$$a_t = 2\frac{y_1 - y_0 - v_{t0}\sin\alpha\Delta t}{\sin\alpha\Delta t^2}.$$

Equations (3.2), (3.3), (3.9), (3.10), (3.17), (3.18) give the full solution of the kinematic parameters of the target vehicle T.

Figure 4:
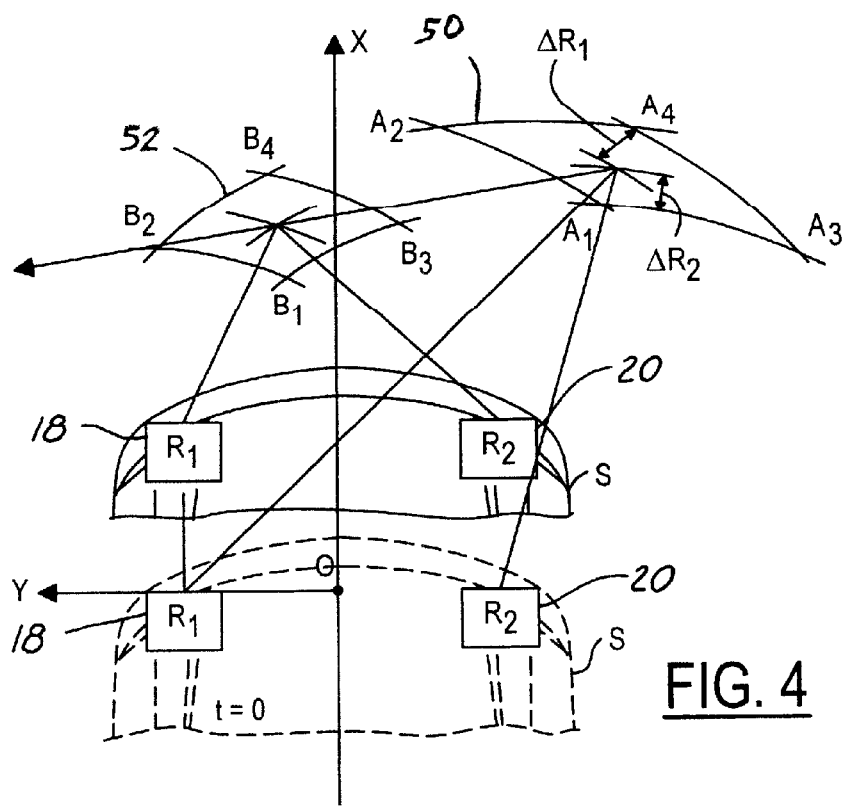
FIG. 4 illustrates two sets of points determined from two subsequent positions.

Referring now to FIG. 4, in the preceding it was assumed that $\pm\Delta R=0$. For a radar, this is typically not the case. In this part it is assumed that radars $R_1$ and $R_2$ measure the distance to the target R, with accuracy $\pm\Delta R\neq 0$. This means that some probability is factored in. Therefore, instead of one point, a set of points is determined. In this case, the real position of the target is an unknown point inside this set.

In this example, the analytical description of a set 50 of possible initial positions of the target as well as a set 52 of possible second positions is constructed. As will be further described below a search method for determining a couple of positions: one from each set is created. This couple of position points will be as close as possible to the real positions of target vehicle.

The determination of a couple from the sets of possible solutions is important because small errors in radar range accuracies can result in large variations in the target azimuth position estimation with the triangulation method. For example, delta theta, which corresponds to the angle subtended by points $A_2$ and $A_3$ in FIG. 4, is very strongly influenced by the bearing location of the target object.

Figure 5A:
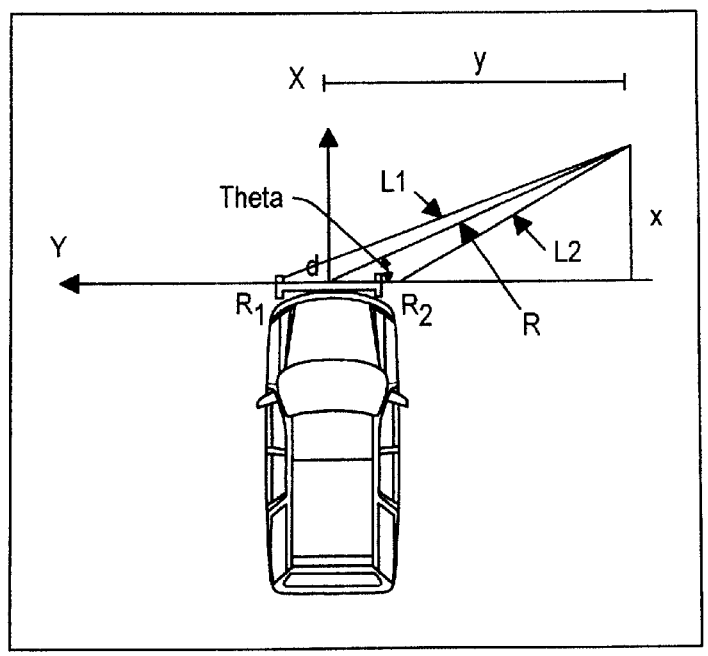
FIG. 5A is a top view of a source vehicle illustrating parameter in determining the accuracy of the system.
Figure 5B:
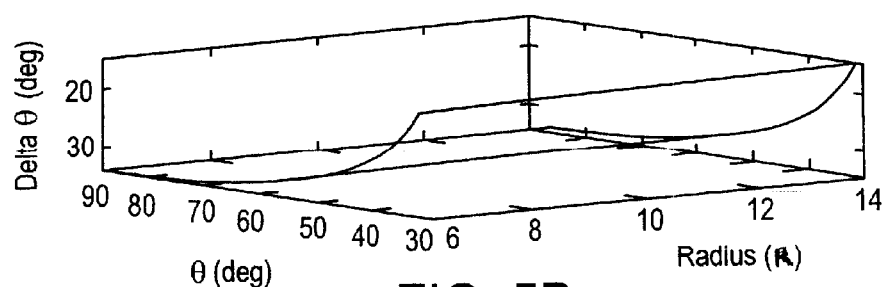
FIG. 5B is a contour plot illustrating the accuracy of various angle determinations.
Figure 5C:
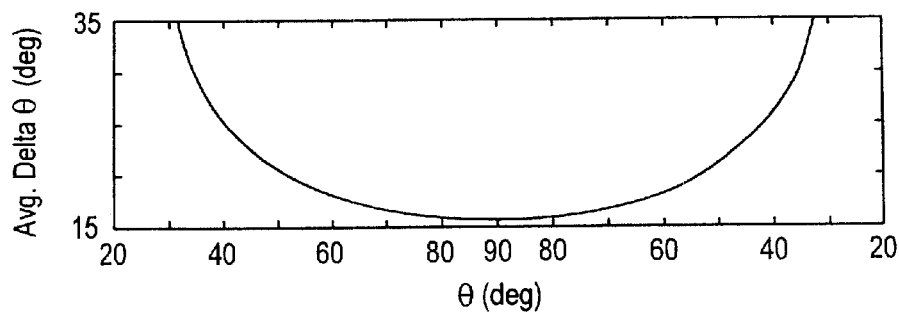
FIG. 5C is a side view of FIG. 5B illustrating the accuracy of the average delta theta versus angle theta.

FIGS. 5A and 5B show the variations in angle subtended at the origin (delta theta) as a function of radial distance and angular position, when d=36 cm and $\Delta R$=5 cm. As seen from the three-dimensional part of FIG. 5B, delta theta is almost constant for radial distances between 6 and 14 meters. This fact was used to simplify the picture to two dimensions as shown in FIG. 5C. Accurate azimuth determination is important for object tracking and threat assessment for pre-crash sensing. A technique to accurately determine object azimuth position using the Doppler effect is developed below.

It should be noted that in general each radar has its own accuracy of measurement. It is assumed that the accuracies are different: $\Delta R_1$ and $\Delta R_2$. Obviously, the possible initial positions set of the target is bounded with four intersecting circles. These circles have radii $R_{10}-\Delta R_1$, $R_{10}+\Delta R_1$, $R_{20}-\Delta R_2$, $R_{20}+\Delta R_2$, respectively, and centers at the points (0, d), (0, −d)—coordinates of radars in $O_{XY}$. The equations of these circles have the following form $$x^2+(y-d)^2=(R_{10}-\Delta R_1)^2, \quad (4.1)$$

$$x^2+(y-d)^2=(R_{10}+\Delta R_1)^2, \quad (4.2)$$

$$x^2+(y+d)^2=(R_{20}-\Delta R_2)^2, \quad (4.3)$$

$$x^2+(y+d)^2=(R_{20}+\Delta R_2)^2, \quad (4.4)$$

If the four equations are solved: 1) (4.1), (4.3); 2) (4.1), (4.4); 3) (4.2), (4.3); 4) (4.2), (4.4), the co-ordinates of the four extreme points $A_1$, $A_2$, $A_3$, $A_4$, are obtained for the possible initial positions set of the target. Furthermore, equation (3.6) may be used for the analytical description of the possible second set of positions for the target.

In this case the equations of the four circles in the form $$\left(x - v_{s0}\Delta t - \frac{1}{2}a_s\Delta t^2\right)^2 + (y-d)^2 = (R_{11}-\Delta R_1)^2, \quad (4.5)$$

$$\left(x - v_{s0}\Delta t - \frac{1}{2}a_s\Delta t^2\right)^2 + (y-d)^2 = (R_{11} + \Delta R_1)^2, \quad (4.6)$$

$$\left(x - v_{s0}\Delta t - \frac{1}{2}a_s\Delta t^2\right)^2 + (y+d)^2 = (R_{21} - \Delta R_2)^2, \quad (4.7)$$

and, $$\left(x - v_{s0}\Delta t - \frac{1}{2}a_s\Delta t^2\right)^2 + (y+d)^2 = (R_{21} + \Delta R_2)^2 \quad (4.8)$$

are obtained.

Solving the four systems: 1) (4.5), (4.7); 2) (4.5), (4.8); 3) (4.6), (4.7); 4) (4.6), (4.8) the coordinates of four extreme points $B_1$, $B_2$, $B_3$, $B_4$, for the possible second positions set 52 of the target are found.

The procedure for determining a solution to multiple sets of points is outlined below. A couple of target positions: one from each set is chosen. Values $R_{10}$, $R_{11}$, $R_{20}$, $R_{21}$, $\dot{R}_{10}$, $\dot{R}_{20}$ are known for this couple of positions so the equations (2.1) to (3.18) may be solved and the corresponding values of cos $\alpha$, sin $\alpha$, cos $\theta_{10}$, sin $\theta_{10}$, $v_{t0}$, and $a_t$ found. The range-rate $\dot{R}_{11}$ is calculated and the calculated range-rate is compared with the measured range-rate from the pulsed Doppler radar sensor 18 at the second time moment. If the calculated and measured values of $\dot{R}_{11}$ are extremely close to each other for any couple of the target positions then this, couple is the solution.

The explicit expression for $\dot{R}_{11}$ (similar to 3.6) is determined as $$\dot{R}_{11} = -v_{s1}\cos\theta_{11} + v_{t1}\cos(\theta_{11}-\alpha) \quad (4.9)$$

where $v_{s1} = v_{s0+\Delta t a_s}$ is the velocity of the source vehicle S at the moment $t=\Delta t$, $v_{t1} = v_{t0} + \Delta t a_t$ is the velocity of the target vehicle T at the moment $t=\Delta t$.

To calculate $\theta_{11}$, the angle that corresponds to the chosen target positions, the following equations are used $$x_1 - x_{s1} = R_{11}\cos\theta_{11},$$
$$y_1 - y_{s1} = R_{11}\sin\theta_{11}.$$

As a result $$\cos\theta_{11} = \frac{x_1 - x_{s1}}{R_{11}}, \quad (4.10)$$

and $$\sin\theta_{11} = \frac{y_1 - y_{s1}}{R_{11}}. \quad (4.11)$$

In (4.10), (4.11) $x_1, y_1$ are determined from (3.7), (3.8), and $x_{1s}, y_{1s}$ from (3.4).

Finally, using identity $$\cos(\theta_{11}-\alpha) = \cos\theta_{11}\cos\alpha + \sin\theta_{11}\sin\alpha$$

Equation (4.9) may be expressed in the form $$\dot{R}_{11} = -(v_{s0}+\Delta t a_s)\cos\theta_{11} + (v_{t0}+\Delta t a_t)(\cos\theta_{11}\cos\alpha + \sin\theta_{11}\sin\alpha), \quad (4.12)$$

Figure 6:
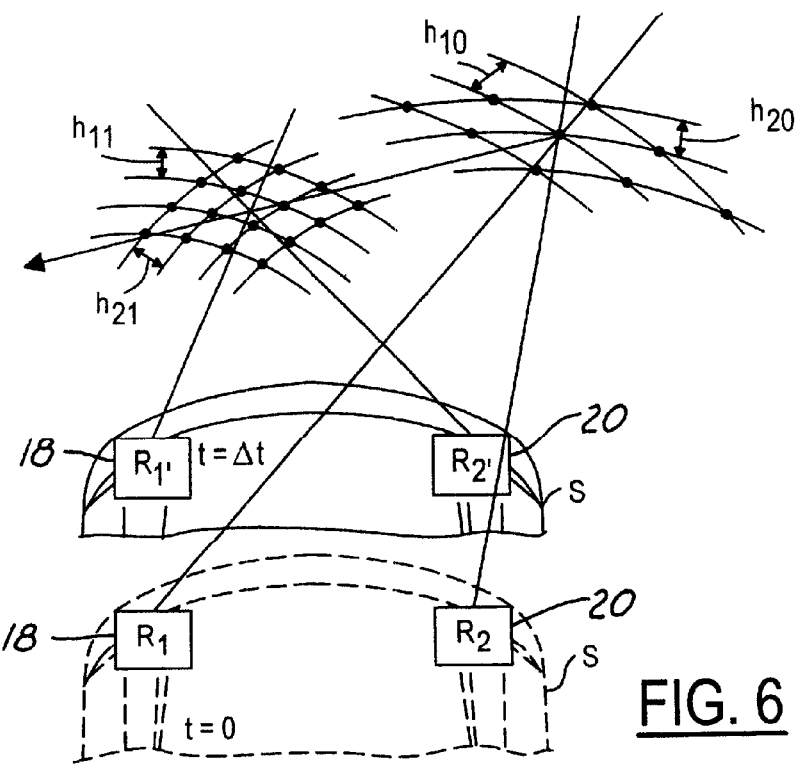
FIG. 6 is a plot illustrating a "net" of sets relative to the host vehicle.

Referring now to FIG. 6, to effectively use the two set algorithm, it may be desirable organize a retrieval sequence of points from two sets.

The first case is referred to as the "net case." In this case the set of the possible initial positions of the target is illustrated. Any positive integer number no may be used as the partition interval number for this set along radius-vectors $\vec{R}_{10}$ and $\vec{R}_{20}$. Lengths $h_{10}$ and $h_{20}$ of each interval may be calculated by using the formulas $$h_{10} = \frac{2\Delta R_1}{n_0}, \quad h_{20} = \frac{2\Delta R_2}{n_0}.$$

From this, the minimal lengths of radius-vectors: $R_{min10} = R_{10} - \Delta R_1$, $R_{min20} = R_{20} - \Delta R_2$ may be determined. A computer program such as Matlab™ may be used assuming the values to be initial and by adding to them $h_{10}$ and $h_{20}$ in double cycle to organize an exhaustive search of all the net'points. The full number of net points is equal to $(n_0+1)^2$ from FIG. 6. The set of the possible positions of the target at the second moment of time $t=\Delta t$ also is considered. A net of points for this set is analogously determined. Another positive integer number $n_1$ is assigned. $R_{min11} = R_{11} - \Delta R_1$, $R_{min21} = R_{21} - \Delta R_2$ are calculated. Then, lengths $h_{12}$ and $h_{22}$ may be obtained by the formulas $$h_{11} = \frac{2\Delta R_1}{n_1}, \quad h_{21} = \frac{2\Delta R_2}{n_1}.$$

The full number of net points is equal to $(n_1+1)^2$.

It should be noted that the full number of possible pairs of target positions is $$N = (n_0+1)^2(n_1+1)^2.$$

Figure 7:
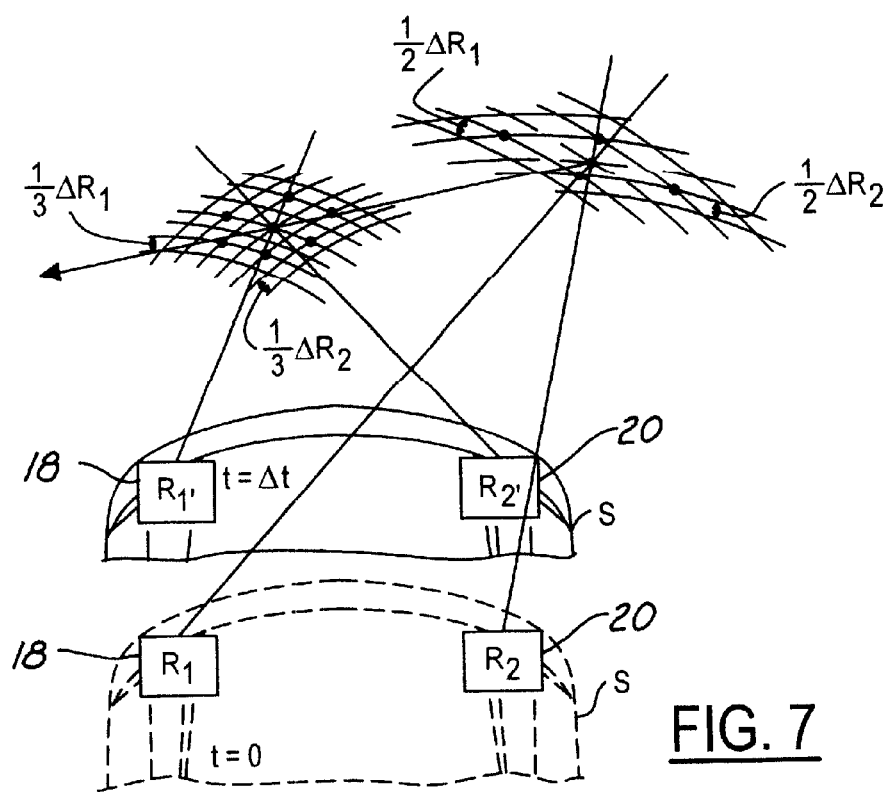
FIG. 7 is a plot illustrating a "local net in the center" of sets relative to the host vehicle.

Referring now to FIG. 7, another way in which to approach the use of sets is a "local net in the center" approach. The case illustrated in FIG. 6 may approach or could quickly lead to a large number of possible pairs of target positions. For example, if $n_0=2$ and $n_1=3$ (from FIG. 6) then $N=(2+1)^2(3+1)^2=144$ different variants of possible target positions have to be considered. The large number of possible pairs of target positions may make this approach less practical for real time implementation in an actual automotive safety application.

To eliminate this potential limitation, it is desirable to decrease the full number of possible pairs of target positions without loosing the method'quality. Obviously, the probability that the real position of the target is located on the boundary of the sets is very small. Therefore, it is not necessary to consider boundary points of the net. Moreover, the formation principle of the net may be changed.

It should be noted that the formation principle of the net may be refined by doing experiments with the specific experimental data from the particular type of radar.

Consider for example, a local net of five points for the set of initial positions of the target and a local net of seven points for the set of the possible positions of the target at the second moment $t=\Delta t$ of time (FIG. 7). It should be noticed that the full number of possible pairs of target positions will be only 5×7=35 (instead of 144). For a computer program realization, the local nets may be determined as special matrices with dimensions (5×2) and (7×2), respectively. Each row of each matrix contains two values of lengths of two radius-vectors. Then the point of intersection of two circles will be one element of the local net. The co-ordinates of this point may be calculated by using Equations (3.2), (3.3) or (3.7), (3.8).

For example, matrices A, B may be determined as the following:

$$A = \begin{pmatrix} R_{10} - \frac{1}{2}\Delta R_1 & R_{20} - \frac{1}{2}\Delta R_2 \\ R_{10} + \frac{1}{2}\Delta R_1 & R_{20} - \frac{1}{2}\Delta R_2 \\ R_{10} & R_{20} \\ R_{10} - \frac{1}{2}\Delta R_1 & R_{20} + \frac{1}{2}\Delta R_2 \\ R_{10} + \frac{1}{2}\Delta R_1 & R_{20} + \frac{1}{2}\Delta R_2 \end{pmatrix}$$

$$B = \begin{pmatrix} R_{11} - \frac{2}{3}\Delta R_1 & R_{21} - \frac{1}{3}\Delta R_2 \\ R_{11} - \frac{2}{3}\Delta R_1 & R_{21} + \frac{1}{3}\Delta R_2 \\ R_{11} & R_{21} - \frac{2}{3}\Delta R_2 \\ R_{11} & R_{21} \\ R_{11} & R_{21} + \frac{2}{3}\Delta R_2 \\ R_{11} + \frac{2}{3}\Delta R_1 & R_{21} - \frac{1}{3}\Delta R_2 \\ R_{11} + \frac{1}{3}\Delta R_1 & R_{21} + \frac{1}{3}\Delta R_2 \end{pmatrix}$$

Figure 8:
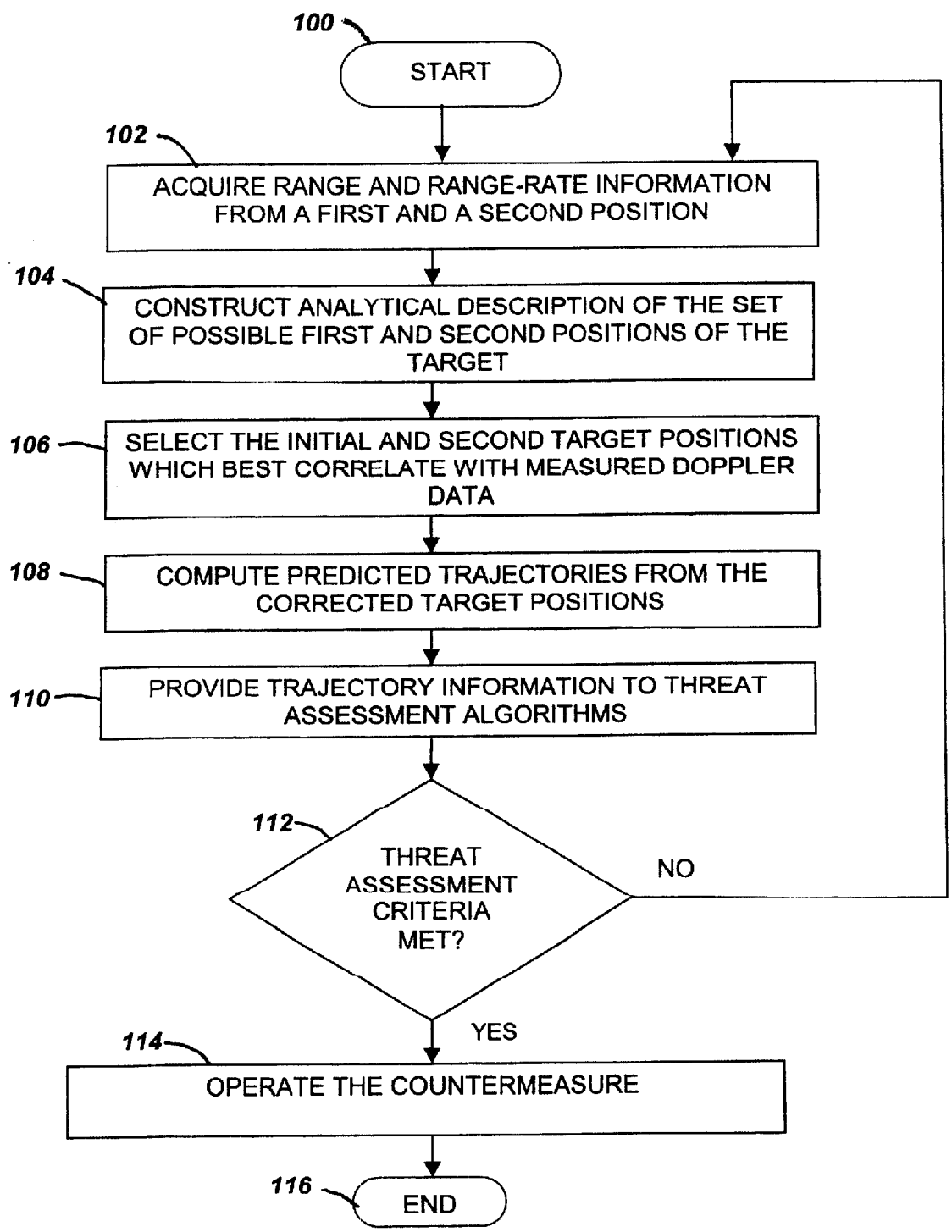
FIG. 8 is a summarizing flow chart of the operation of the present invention.

Referring now to FIG. 8, the process is summarized. The process starts in starting block 100. In block 102 the range and range-rate information when the object is at the first and the second positions is obtained from the radar sensors.

In step 104 a value of $\overline{R}_{10}$ from the closed interval $[R_{10}-\Delta R_1, R_{10}+\Delta R_1]$ is chosen based upon the initial range measurement. Also a value of $\overline{R}_{20}$ from the closed interval $[R_{20}-\Delta R_2, R_{20}+\Delta R_2]$ is chosen based upon the initial range measurement. The initial co-ordinates of the target—$(x_0,y_0)$ using $\overline{R}_{10}$, $\overline{R}_{20}$ and Equations (3.2), (3.3) are calculated. A value of $\overline{R}_{11}$ is chosen from the closed interval $[R_{11}-\Delta R_1, R_{11}+\Delta R_1]$ based upon the second range measurement. A value of $\overline{R}_{21}$ from the closed interval $[R_{21}-\Delta R_2, R_{21}+\Delta R_2]$ is also chosen based upon the second range measurement. The co-ordinates of the target—$(x_1, y_1)$ at the moment $t=\Delta t$ using $\overline{R}_{11}$, $\overline{R}_{21}$ and formulas (3.7), (3.8) are determined.

In step 106, $\cos \overline{\alpha}$, $\sin \overline{\alpha}$, $\cos \overline{\theta}_{10}$, $\sin \overline{\theta}_{10}$, $\overline{v}_{r0}$ and $\overline{a}_{r0}$ are calculated using appropriate equations as described before.

Also, Values of $\cos \overline{\theta}_{11}$, $\sin \overline{\theta}_{11}$ using formulas (4.10), (4.11) are determined. The value of $\dot{R}_{11}$ using formula (4.12) is determined. The value of $$\left| \dot{R}_{11} - \overline{\dot{R}}_{11} \right|,$$

is compared with its value for the previous pair of target positions from the set. If the new value is less than the previous one, then this value is stored until a better correlation is found from a new pair of target positions and the related parameters. In this example, $\dot{R}_{11}$ is the real measurement from one of the radar sensors. In step 108 the target velocity, acceleration and direction of travel (the target trajectory) are predicted based on the best matching couple of target positions. In step 110 the trajectory information is provided to a threat assessment algorithm. In step 112, the threat assessment algorithm compares the possibility of impact threat against predefined threshold values. If the threat assessment criteria is met in step 112, step 114 activates the countermeasure and the operation finally ends in step 116. In step 112, if the threat assessment threshold is not met the operation returns to step 102 to acquire new range and range-rate data from the radar sensors.

It should be noted that the iterative procedure for determining the target position is stopped when a predetermined minimum value for $$\left| \dot{R}_{11} - \overline{\dot{R}}_{11} \right|$$

is reached.

The present disclosure describes an algorithm for position estimation of radar targets, which can be implemented in a vehicle equipped with a multi-sensor pulsed radar sensor system (with at least one sensor with Doppler measurement capabilities). If more than one pulsed sensor has Doppler capabilities, it may be used to validate the prediction of the first Doppler radar sensor with some additional computational costs.

While particular embodiments of the invention have been shown and described, numerous variations and alternate embodiments will occur to those skilled in the art. Accordingly, it is intended that the invention be limited only in terms of the appended claims.

What is claimed is:

1. A sensing system for an automotive vehicle comprising:
   a first radar sensor generating a first range and a second range signal;
   a second radar sensor generating a first range and a second range signal;
   said first or second radar sensor generating a measured range-rate; and
   a controller coupled to said first radar sensor and said second radar sensor, said controller calculating a first position and a second position from the first radar sensor and the second radar sensor range measurements, generating a first set of points corresponding to the first position, generating a second set of points corresponding to the second position, calculating a plurality of calculated range-rate values in response to the first set of points and the second set of points, comparing the plurality of calculated range- values to the measured range-rate, selecting a closest range-rate from the plurality of calculated range-rate values and generating a couple of target position points from the first set of points and the second set of points corresponding to the closest range-rate to the measured range-rate.

2. A system as recited in claim 1 wherein said controller generates a target object trajectory from the couple of selected target position points.

3. A system as recited in claim 1 further comprising a countermeasure, said controller controlling a countermeasure in response to the target object trajectory.

4. A system as recited in claim 1 further comprising a vehicle speed sensor generating a source vehicle speed signal corresponding to the longitudinal speed of the vehicle; wherein said controller activates said countermeasures in response to the source vehicle speed signal.

5. A method of determining the position of a target vehicle comprising:
   determining a first range and a second range from a first radar sensor;
   determining a first range and a second range from a second radar sensor;

calculating a first position and a second position from the first range and second range measurements;

evaluating a measured range-rate;

generating a first set of points corresponding to the first position;

generating a second set of points corresponding to the second position;

calculating a plurality of calculated range-rate values in response to the first set of points and the second set of points;

comparing the plurality of calculated range-rate values to the measured range-rate;

selecting the closest range-rate to the measured range-rate from the plurality of range-rate values; and generating a couple of target object position points from the first set of points and the second set of points corresponding to the closest range-rate to the measured range-rate.

6. A method as recited in claim 5 further comprising generating a trajectory from the couple target object position points.

7. A method as recited in claim 5 further comprising generating a target velocity from the couple of target object position points.

8. A method as recited in claim 5 wherein calculating comprises calculating a plurality of calculated range-rate values for each of the first set of points with each point of the second set of points.

9. A method of operating a countermeasure system comprising:

determining a first range and a second range from a first radar sensor;

determining a first range and a second range from a second radar sensor;

calculating a first position and a second position from the first range and second range measurements;

evaluating a measured range-rate;

generating a first set of points corresponding to the first position;

generating a second set of points corresponding to the second position;

calculating a plurality of calculated range-rate values in response to the first set of points and the second set of points;

comparing the plurality of calculated range values to the measured range-rate;

selecting the closest range-rate from the plurality of range-rate values; and generating a couple of target object position points from the first set of points and the second set of points corresponding to the closest calculated range-rate to the measured range-rate.

10. A method as recited in claim 9 further comprising generating a trajectory from the couple of target object position points.

11. A method as recited in claim 9 further comprising controlling a countermeasure in response to the target object trajectory.

12. A method as recited in claim 9 further comprising generating a target object velocity from the couple of target object position points.

13. A method as recited in claim 9 further comprising controlling the countermeasure in response to the target velocity.

14. A method as recited in claim 9 further comprising generating a target object acceleration.

15. A method as recited in claim 9 further comprising controlling the countermeasure in response to the target acceleration.

16. A system as recited in claim 9 further comprising generating a source vehicle speed signal corresponding to the longitudinal speed of the vehicle; and activating a countermeasure in response to the source vehicle speed signal.

17. A method as recited in claim 16 wherein activating a countermeasure comprises activating at least one of pre-arming airbags, pretensioning motorized belt pretensioners, activating and adjusting the host vehicle suspension height in response to the target object trajectory.

* * * * *